US012392734B2

(12) United States Patent
Zou et al.

(10) Patent No.: US 12,392,734 B2
(45) Date of Patent: Aug. 19, 2025

(54) CARVED CODE QUALITY DETECTION APPARATUS AND SYSTEM

(71) Applicant: CONTEMPORARY AMPEREX TECHNOLOGY (HONG KONG) LIMITED, Hong Kong (CN)

(72) Inventors: Xiaohong Zou, Ningde (CN); Yunlong Song, Ningde (CN); Huqiang Xin, Ningde (CN); Lei Song, Ningde (CN); Xiaohui Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 210 days.

(21) Appl. No.: 18/343,990

(22) Filed: Jun. 29, 2023

(65) Prior Publication Data

US 2024/0151655 A1    May 9, 2024

Related U.S. Application Data

(63) Continuation of application No. PCT/CN2023/084754, filed on Mar. 29, 2023.

(30) Foreign Application Priority Data

Nov. 4, 2022  (CN) .......................... 202222935238.6

(51) Int. Cl.
  *G01N 21/956*  (2006.01)
  *G01N 21/88*  (2006.01)
  (Continued)

(52) U.S. Cl.
  CPC ....... *G01N 21/956* (2013.01); *G01N 21/8851* (2013.01); *H04N 23/54* (2023.01); *H04N 23/56* (2023.01)

(58) Field of Classification Search
  CPC .. G01N 21/956; G01N 21/8851; H04N 23/54; H04N 23/56
  See application file for complete search history.

(56) References Cited

U.S. PATENT DOCUMENTS

| 2006/0001759 A1* | 1/2006 | Raschke | ................ G03B 17/04 |
| | | | 348/335 |
| 2019/0077534 A1* | 3/2019 | Liu | .......................... B41J 3/283 |
| 2019/0273852 A1 | 9/2019 | Schneider et al. | |

FOREIGN PATENT DOCUMENTS

| CN | 105258727 A | 1/2016 |
| CN | 207071745 U | 3/2018 |

(Continued)

OTHER PUBLICATIONS

Extended European Search Report dated Jul. 8, 2024 for Application No. EP 23731930.6.

(Continued)

*Primary Examiner* — Sunghyoun Park
(74) *Attorney, Agent, or Firm* — Ladas & Parry LLP (57) ABSTRACT

The disclosure relates to the technical field of detection devices, and provides a carved code quality detection apparatus and system, wherein the carved code quality detection apparatus includes: a support assembly, including a guide rod, a baffle and a first support plate, the guide rod extending along the height direction, the baffle being fixedly connected to the upper end of the guide rod, and the first support plate being fixedly connected to the lower end of the guide rod; a visual detection system, including an imaging assembly movably connected to the guide rod; and a driving assembly, arranged on the baffle and connected to the imaging assembly, the driving assembly being configured to drive the imaging assembly. The technical solutions can achieve online detection of the carved code quality of a member to (Continued)

be detected, thereby reducing the risk of false detection or missed detection caused by manual visual inspection.

12 Claims, 2 Drawing Sheets

(51) Int. Cl.
    *H04N 23/54*     (2023.01)
    *H04N 23/56*     (2023.01)

(56) References Cited

FOREIGN PATENT DOCUMENTS

| | | |
|---|---|---|
| CN | 209096264 U | 7/2019 |
| CN | 209535639 U | 10/2019 |
| CN | 209808288 U | 12/2019 |
| CN | 111013685 A | 4/2020 |
| CN | 211505182 U | 9/2020 |
| CN | 214253232 U | 9/2021 |
| CN | 217084697 U | 7/2022 |
| CN | 218412286 U | 1/2023 |

OTHER PUBLICATIONS

International Search Report dated Jul. 24, 2023 for Application No. PCT/CN2023/084754.

* cited by examiner

CARVED CODE QUALITY DETECTION APPARATUS AND SYSTEM

CROSS-REFERENCE TO RELATED APPLICATIONS

This application is a continuation of International application PCT/CN2023/084754 filed on Mar. 29, 2023 that claims priority to Chinese Patent Application No. 202222935238.6 filed on Nov. 4, 2022. The subjection of which is incorporated herein by reference in its entirety

TECHNICAL FIELD

The present application relates to the technical field of detection devices, particularly to a carved code quality detection apparatus and system.

BACKGROUND

At present, in the processes of manufacturing a power battery, data collection for each machine entering and exiting a station requires scanning the carved code on a part such as a battery top cover to obtain relevant information of a battery cell, and the carved code includes data information such as a serial number of a product, so the carved code quality of the battery top cover directly affects the traceability of the product and the quality stability of the product.

In related technologies, the carved code on a part such as a battery top cover is scanned by a scanning gun. In the process of scanning detection using the scanning gun, the scanning gun can only scan and read the code on the battery top cover, but cannot perform online detection of the carved code quality of the battery top cover. When a visual detection station in a logistics line is used for achieving detection of defective carved codes, the labor cost is higher, and comprehensive detection cannot be achieved, resulting in missed detection.

SUMMARY OF THE INVENTION

In view of the above problems, the present application provides a carved code quality detection apparatus and system to achieve online detection of the carved code quality of a member to be detected, thereby reducing the risk of false detection or missed detection caused by manual visual inspection.

According to the first aspect, the present application provides a carved code quality detection apparatus, including: a support assembly, including a guide rod, a baffle and a first support plate, the guide rod extending along the height direction, the baffle being fixedly connected to the upper end of the guide rod, and the first support plate being fixedly connected to the lower end of the guide rod; a visual detection system, including an imaging assembly movably connected to the guide rod; and a driving assembly, arranged on the baffle and connected to the imaging assembly, the driving assembly being configured to drive the imaging assembly to move up or down.

According to the carved code quality detection apparatus provided by the present application, the visual detection system is configured to detect the carved code quality of a member to be detected by shooting and identifying, so that the manual detection cost can be reduced, and the condition of incomplete detection, false detection or missed detection caused by manual visual inspection can be avoided. Before detection, the driving assembly drives the imaging assembly of the visual detection system to move up or down along the guide rod, so as to enable the imaging assembly to move in a direction close to or away from the member to be detected, and the distance between the imaging assembly and the member to be detected is controlled at an appropriate position, thereby ensuring that the imaging assembly can shoot clearer images to ensure the accuracy in detecting the carved code quality of the member to be detected by the visual detection system.

In addition, the carved code quality detection apparatus provided according to the present application may also have the following additional technical features:

In some embodiments of the present application, the driving assembly includes: a lead screw, extending along the height direction, the first end of the lead screw penetrating through the baffle; a screw drive member in threaded connection with the lead screw, the screw drive member being fixedly connected to the imaging assembly, and the screw drive member being configured to drive the imaging assembly to reciprocate along the length direction of the lead screw when the lead screw rotates; and a driving member, arranged on the baffle and connected to the first end of the lead screw to drive the lead screw to rotate.

The lead screw is in threaded connection with the screw drive member to form a ball screw structure, and the ball screw can convert rotary motion into linear motion. When the driving member drives the lead screw to rotate along different directions, the screw drive member can reciprocate along the length direction of the lead screw to drive the imaging assembly to reciprocate along the length direction of the lead screw, thereby realizing the adjustment of the relative position between the imaging assembly and the member to be detected. The structure and principle are relatively simple and easy to implement.

In some embodiments of the present application, the imaging assembly includes a second support plate, a connecting plate assembly connected to one side of the second support plate, and a charge coupled device (CCD) connected to the connecting plate assembly, wherein the second support plate is fixedly connected to the screw drive member, the second support plate is provided with first guide holes, and the guide rod is inserted into the first guide hole.

The CCD is configured to shoot a carved code image of the member to be detected, and the CCD is fixedly connected to the second support plate through the connecting plate assembly. By fixedly connecting the second support plate to the screw drive member and providing the first guide holes on the second support plate, when the guide rod is inserted into the first guide hole, the guide rod can play a guide role to improve the stability of the second support plate and the CCD arranged on the second support plate when moving up or down along the guide rod.

In some embodiments of the present application, one end of the second support plate is provided with a first elastic groove communicated with the first guide hole; and the imaging assembly further includes a first elasticity adjusting member, and the first elasticity adjusting member penetrates through two side walls of the first elastic groove to adjust the elasticity of the first elastic groove.

By arranging the first elastic groove and adjusting the size of the opening of the first elastic groove through the first elasticity adjusting member, in this way, when the imaging assembly is adjusted to an appropriate position, the opening of the first elastic groove can be reduced by tightening the first elasticity adjusting member, and then, the second support plate can be fixed at the corresponding position of the guide rod, thereby ensuring the stability of the imaging assembly when shooting the carved code image of the member to be detected; and the first elastic groove can be enlarged by loosening the first elasticity adjusting member, and then, the fixation between the second support plate and the guide rod can be released. The operation is simple and fast.

In some embodiments of the present application, the connecting plate assembly includes a first plate body and a second plate body adjustably and fixedly connected to the first plate body, one end of the first plate body is fixedly connected to one side of the second support plate, the other end of the first plate body extends away from the second support plate along the horizontal direction, the second plate body is fixedly connected to the CCD, and the second plate body is adapted to move relative to the first plate body in a direction close to or away from the second support plate.

The second plate body can move relative to the first plate body in a direction close to or away from the second support plate, that is, the position of the CCD can be adjusted along the horizontal direction, so that when shooting carved code images of members to be detected of different sizes and specifications, the CCD can shoot clear and complete carved code images in a mode of transverse movement, resulting in wider product applicability.

In some embodiments of the present application, the first plate body and the second plate body are lapped, the first plate body is provided with a first sliding groove, the second plate body is provided with a second sliding groove communicated with the first sliding groove, and both the first sliding groove and the second sliding groove extend away from the second support plate along the horizontal direction, and are configured for fasteners to pass through to fix the relative positions of the first plate body and the second plate body.

When the second plate body moves relative to the first plate body to an appropriate position, fasteners are used to pass through the first sliding groove and the second sliding groove to fasten the first plate body and the second plate body, so as to prevent the relative movement between the first plate body and the second plate body in a free state, thereby ensuring the stability of the CCD when shooting images.

In some embodiments of the present application, the visual detection system further includes a light source assembly, and the light source assembly is arranged below the imaging assembly and is adjustably and fixedly connected to the guide rod.

By arranging the light source assembly below the imaging assembly, the light source assembly is configured to provide a light source in conjunction with the imaging assembly, so as to ensure clearer carved code images shot by the imaging assembly.

In some embodiments of the present application, the light source assembly includes a third support plate, a light source connecting plate connected to one side of the third support plate, and a light-emitting element connected to the light source connecting plate, and the third support plate is adjustably and fixedly connected to the guide rod.

The third support plate is adjustably and fixedly connected to the guide rod, that is, the third support plate can move along the length direction of the guide rod and can be fixed with the guide rod when moving to an appropriate position, so as to ensure that the light-emitting element can cooperate with the imaging assembly to emit a light source at an appropriate height, thereby ensuring clearer images shot by the imaging assembly.

In some embodiments of the present application, the third support plate is provided with second guide holes, the guide rod is inserted into the second guide hole, and one end of the third support plate is provided with a second elastic groove communicated with the second guide hole; and the light source assembly further includes a second elasticity adjusting member, and the second elasticity adjusting member penetrates through two side walls of the second elastic groove to adjust the elasticity of the second elastic groove.

The guide rod is inserted into the second guide hole on the third support plate, so that the third support plate can move along the length direction of the guide rod. By arranging the second elastic groove, when the light-emitting element is adjusted to an appropriate position, the opening of the second elastic groove can be reduced by tightening the second elasticity adjusting member, and then, the third support plate can be fixed at the corresponding position of the guide rod, thereby ensuring the stability of mounting and fixing of the light-emitting element; and the opening of the second elastic groove can be enlarged by loosening the second elasticity adjusting member, then, the fixation between the third support plate and the guide rod can be released, and at this time, the third support plate can move along the guide rod. The operation is simple and fast.

In some embodiments of the present application, the light-emitting element is configured to optionally emit light of different colors.

Since different types of members to be detected may have different colors, the light-emitting element is configured to emit light of different colors. As a result, when the imaging assembly shoots the carved code image of a member to be detected, the light-emitting element is used to emit light matched with the color of the member to be detected, so as to avoid interference between the color of the member to be detected and a single light source, so that the image shot by the imaging assembly is clearer, which helps to improve the accuracy of identification and detection of the carved code of the member to be detected.

In some embodiments of the present application, the carved code quality detection apparatus further includes a position display, and the position display is arranged between the driving member and the baffle and is in threaded connection with the lead screw to display the height of the CCD.

The height of the CCD can be displayed in real time by the position display. By recording the height information of the CCD when detecting different types of members to be detected, when the type of the member to be detected is changed, the height information of the CCD matched with this type of member to be detected can be quickly found, and the CCD can be quickly adjusted to this height.

In some embodiments of the present application, two guide rods are provided, and the two guide rods are symmetrically arranged relative to a center line of the baffle.

By symmetrically arranging the two guide rods relative to the center of the baffle, the stability and reliability of the support function of the support assembly can be improved, and the stability of the imaging assembly when reciprocating along the length direction of the guide rod can be further improved.

According to the second aspect, the present application provides a carved code quality detection system, including: an industrial personal computer; a conveyor, configured to convey a member to be detected; a code carving apparatus, configured to carve a code on the member to be detected; a carved code quality detection apparatus according to any item in the first aspect, arranged at the downstream side of the code carving apparatus, the visual detection system of the carved code quality detection apparatus being electrically connected to the industrial personal computer; and a removing apparatus, arranged at the downstream side of the carved code quality detection apparatus and electrically connected to the industrial personal computer to remove the member to be detected from the conveyor.

According to the carved code quality detection apparatus provided by the present application, the member to be detected is conveyed by the conveyor; after the code carving mechanism carves a code on the member to be detected, the conveyor conveys the member to be detected after code carving to the position below the imaging assembly of the carved code quality detection apparatus; when the visual detection system detects that the carved code image of the member to be detected is inconsistent with the preset standard carved code image, the industrial personal computer controls the removing apparatus to remove the member to be detected from the position below the imaging assembly; and then, the next detection process is carried out to achieve the automated operation of the production line.

DESCRIPTION OF DRAWINGS

Various other advantages and benefits will become apparent to those of ordinary skill in the art upon reading the following detailed description of the preferred embodiments. The drawings are for the purpose of illustrating the preferred embodiments only and are not to be considered a limitation to the present application. Also, the same components are denoted by the same reference numerals throughout the drawings. In the drawings.

DESCRIPTION OF REFERENCE NUMERALS carved code quality detection apparatus 100, battery top cover 200;
support assembly 10, imaging assembly 20, driving assembly 30, light source assembly 40, position display 50;
guide rod 11, first support plate 12, baffle 13, second support plate 21, connecting plate assembly 22, CCD 23, first elasticity adjusting member 24, rotating hand wheel 31, lead screw 32, screw drive member 33, third support plate 41, light source connecting plate 42, light-emitting element 43;
first guide hole 211, first elastic groove 212, connecting hole 213, first plate body 221, second plate body 222, second sliding groove 2221, CCD camera 231, lens 232, second elastic groove 411.

DETAILED DESCRIPTION

Embodiments of the technical solutions of the present application will be described in detail below in conjunction with the drawings. The following embodiments are only used to more clearly illustrate the technical solutions of the present application, and therefore are only used as examples and cannot be used to limit the protection scope of the present application.

Unless otherwise defined, all technical and scientific terms used herein have the same meaning as commonly understood by those skilled in the art belonging to the technical field of the present application. The terms used herein are intended only for the purpose of describing specific embodiments and are not intended to limit the present application. The terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

The reference to "embodiments" herein means that specific features, structures or characteristics described in combination with embodiments may be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is simply a description of an association of associated objects, which indicates that there may exist three relationships, for example, A and/or B may mean: the presence of A, the presence of both A and B, and the presence of B. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationships indicated by technical terms such as "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential", and the like are orientation or position relationships shown based on the drawings. These terms are only for the convenience of describing the embodiments of the present application and simplifying the description, but do not indicate or imply that the specified apparatus or component needs to have a specific orientation and needs to be constructed and operated in the specific orientation, so that it can not be understood as a limitation to the embodiments of the present application.

In the description of the embodiments of the present application, unless otherwise clearly specified and defined, the technical terms "mounting", "connected", "connection", "fixing", and the like should be understood in a broad sense. For example, the "connection" may be fixed connection, detachable connection or integrated connection, may be mechanical connection or electrical connection, or may be direct connection, indirect connection through an intermediate, internal communication of two components, or interaction between two components. For those of ordinary skill in the art, the specific meanings of the above terms in the embodiments of the present application can be understood according to specific situations.

At present, from the perspective of the development of the market situation, power batteries are more and more widely used. Power batteries are used in energy storage power source systems such as hydraulic, thermal, wind and solar power stations as well as in electric vehicles such as electric bicycles, electric motorcycles and electric cars, and military equipment and aerospace fields. With the continuous expansion of the application field of power batteries, the market demand is also constantly expanding.

In the process of manufacturing a power battery, a code carving apparatus is usually used for carving a code on parts such as a battery top cover. The carved code includes data information such as a serial number of a product, and data collection for each machine entering and exiting a station requires scanning the carved code on the battery top cover to obtain relevant information of a battery cell, so the carved code quality of the battery top cover directly affects the traceability of the product and the quality stability of the product.

A scanning gun is usually used for scanning the carved code, but the scanning gun can only scan and read the carved code. When the carved code has quality problems such as skewness, the scanning gun cannot accurately scan and read the code. Therefore, technical personnel will also be arranged in the processing logistics line to detect the carved code quality in a mode of manual visual inspection. The mode of manual visual inspection not only has a high cost for intermediate personnel, but also cannot achieve comprehensive detection, and there are also risks of false detection, missed detection and the like.

In order to solve the problems of high labor cost and easily caused false detection or missed detection during manual visual inspection, the present application designs a carved code quality detection apparatus. The visual detection system is configured to detect the carved code of the member to be detected by shooting and identifying, and the distance between the lens of the imaging assembly of the visual detection system and the member to be detected is adjusted by the driving assembly, thereby achieving quality detection of carved codes of different types of members to be detected. The visual detection system has high detection accuracy, and can not only reduce the condition of false detection or missed detection, but also reduce the labor cost of manual visual inspection.

The carved code quality detection apparatus 100 disclosed in the embodiments of the present application is not only suitable for quality detection of the carved code on the battery top cover 200, but also for quality detection of carved codes on parts of vehicles, ships and the like.

For the convenience of description, the following embodiments take the carved code of a battery top cover 200 in an embodiment of the present application as a detection object for description.

Figure 1:
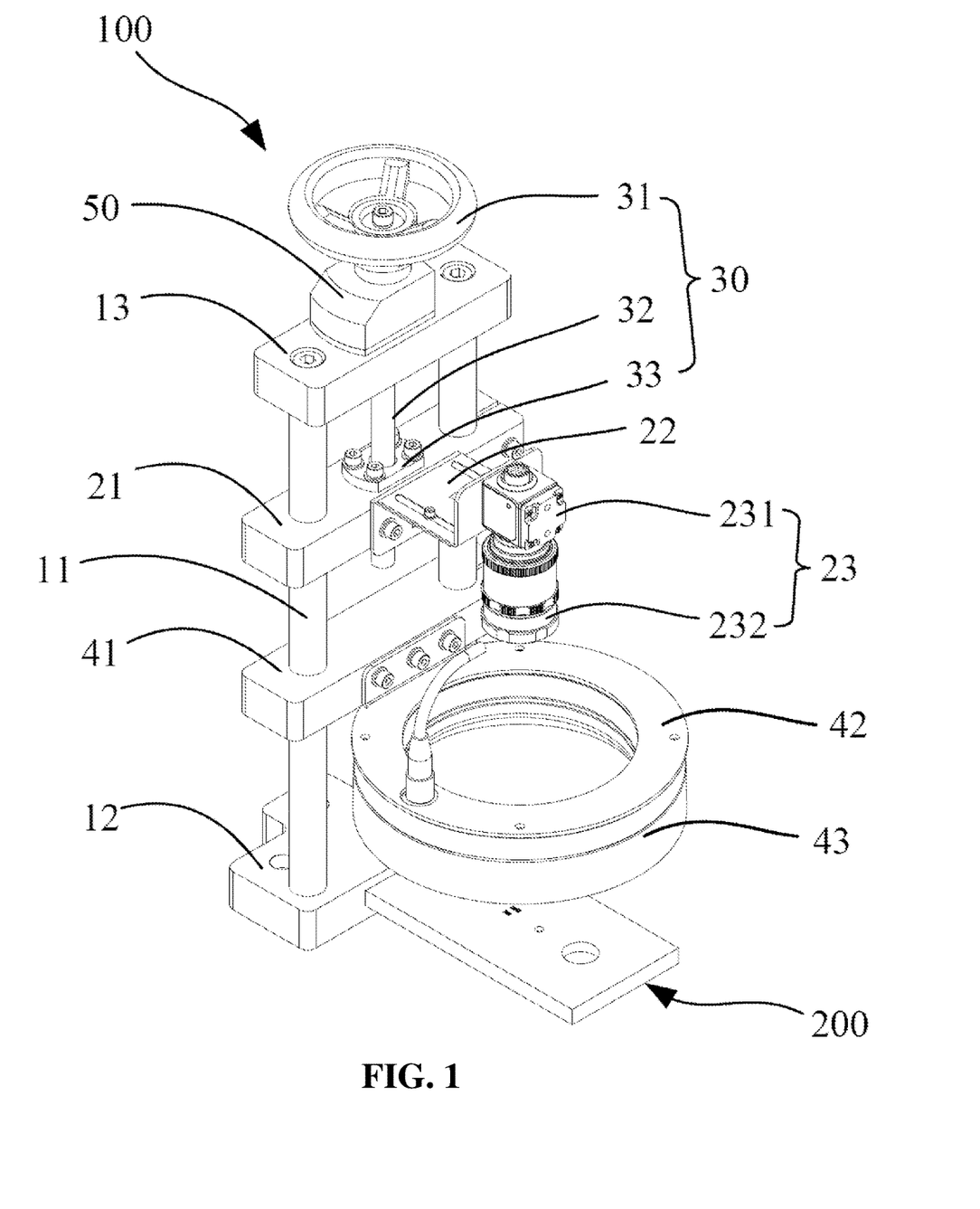
FIG. 1 is a schematic structural view of a carved code quality detection apparatus provided in some embodiments of the present application from one perspective.
Figure 2:
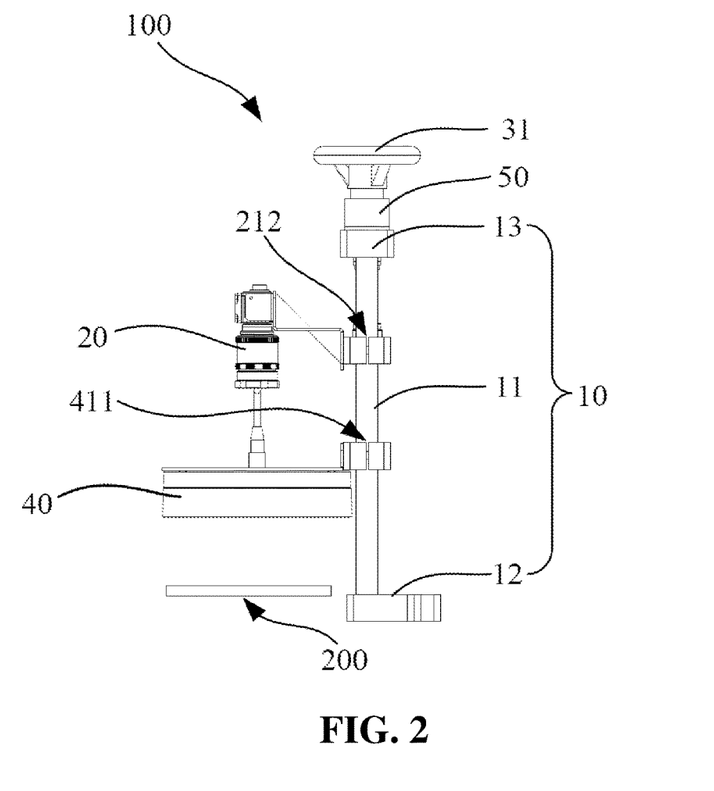
FIG. 2 is a schematic structural view of a carved code quality detection apparatus provided in some embodiments of the present application from another perspective.

Referring to FIG. 1 and FIG. 2, FIG. 1 is a schematic structural view of a carved code quality detection apparatus provided in some embodiments of the present application from one perspective; and FIG. 2 is a schematic structural view of a carved code quality detection apparatus provided in some embodiments of the present application from another perspective. An embodiment of the present application provides a carved code quality detection apparatus 100 for detecting the carved code quality of the battery top cover 200, including a support assembly 10, a visual detection system and a driving assembly 30, wherein the support assembly 10 includes guide rods 11, a baffle 13 and a first support plate 12, the guide rod 11 extends along the height direction, the baffle 13 is fixedly connected to the upper end of the guide rod 11, and the first support plate 12 is fixedly connected to the lower end of the guide rod 11; the visual detection system includes an imaging assembly 20 movably connected to the guide rod 11; and the driving assembly 30 is arranged on the baffle 13 and connected to the imaging assembly 20 to drive the imaging assembly 20 to move up or down.

As shown in FIG. 1, the first support plate 12 can be mounted and fixed with fasteners such as bolts to play a role in supporting the guide rod 11. The guide rod 11 extends along the height direction to play a guide role, and the imaging assembly 20 can reciprocate along the extension direction of the guide rod 11 under the driving action of the driving assembly 30. The baffle 13 plays a role in stopping the imaging assembly 20 to prevent the imaging assembly 20 from detaching from the top of the guide rod 11. The visual detection system includes the imaging assembly 20, the imaging assembly 20 is configured to shoot the carved code image on the battery top cover 200 and send the shot carved code image on the battery top cover 200 to the image detection software of the visual detection system, and the image detection software compares and analyzes the carved code image shot by the imaging assembly 20 with the preset carved code image, so as to detect whether the carved code quality of the battery top cover 200 is qualified.

According to the carved code quality detection apparatus 100 provided in the embodiment of the present application, by arranging the visual detection system on the support assembly 10, the visual detection system can detect the carved code of the battery top cover 200 by shooting and identifying to complete the detection of the carved code quality of the battery top cover 200, so that the manual detection cost can be reduced, and the condition of incomplete detection, false detection or missed detection caused by manual visual inspection can be avoided. Before detection, first, the battery top cover 200 is arranged below the imaging assembly 20, the driving assembly 30 drives the imaging assembly 20 of the visual detection system to move up or down along the guide rod 11, so as to enable the imaging assembly 20 to move in a direction close to or away from the battery top cover 200, and the distance between the imaging assembly 20 and the battery top cover 200 is controlled at an appropriate position, thereby ensuring that the imaging assembly 20 can shoot clearer images to ensure the accuracy in detecting the carved code quality of the battery top cover 200 by the visual detection system.

Referring to FIG. 1, according to some embodiments of the present application, the driving assembly 30 includes: a lead screw 32, extending along the height direction, the first end of the lead screw 32 penetrating through the baffle 13; a screw drive member 33 in threaded connection with the lead screw 32, the screw drive member 33 being fixedly connected to the imaging assembly 20, and the screw drive member 33 being configured to drive the imaging assembly 20 to reciprocate along the length direction of the lead screw 32 when the lead screw 32 rotates; and a driving member, arranged on the baffle 13 and connected to the first end of the lead screw 32 to drive the lead screw 32 to rotate.

Exemplarily, the screw drive member 33 is a lead screw nut. The driving member is a rotating handle or motor. The baffle 13 is provided with a connecting hole for the first end of the lead screw 32 to pass through.

The lead screw has an external thread, the screw drive member 33 has an internal thread, the lead screw 32 is in threaded connection with the screw drive member 33 to form a ball screw structure, and the ball screw can convert rotary motion into linear motion. Specifically, when the driving member drives the lead screw 32 to rotate along different directions, the screw drive member 33 can reciprocate along the length direction of the lead screw 32 to drive the imaging assembly 20 to reciprocate along the length direction of the lead screw 32, thereby realizing the adjustment of the relative position between the imaging assembly 20 and the battery top cover 200. The structure and principle are relatively simple and easy to implement.

Figure 3:
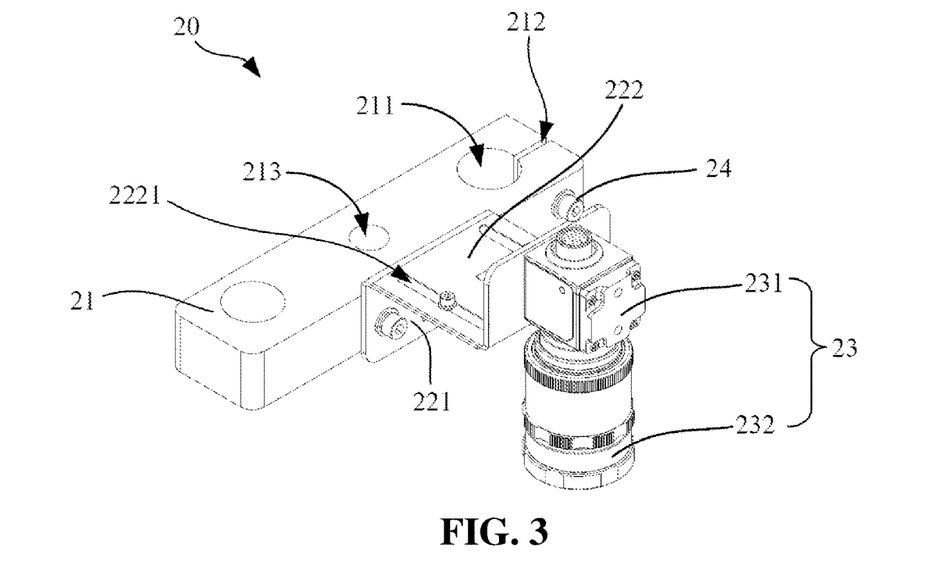
FIG. 3 is a schematic structural view of an imaging assembly provided in some embodiments of the present application.

Referring to FIG. 1 and further referring to FIG. 3, FIG. 3 is a schematic structural view of an imaging assembly 20 provided in some embodiments of the present application. According to some embodiments of the present application, the imaging assembly 20 includes a second support plate 21, a connecting plate assembly 22 connected to one side of the second support plate 21, and a CCD 23 connected to the connecting plate assembly 22, wherein the second support plate 21 is fixedly connected to the screw drive member 33, the second support plate 21 is provided with first guide holes 211, and the guide rod 11 is inserted into the first guide hole 211.

The CCD 23 includes a CCD camera 231 and a lens 232. The CCD camera 231 and the lens 232 are configured to shoot the carved code image of the battery top cover 200. The second support plate 21 is provided with a connecting hole 213 for the second end of the lead screw 32 to pass through.

The CCD is fixedly connected to the second support plate 21 through the connecting plate assembly 22. By fixedly connecting the second support plate 21 to the screw drive member 33 and providing the first guide holes 211 on the second support plate 21, when the guide rod 11 is inserted into the first guide hole 211, the guide rod 11 can play a guide role to improve the stability of the second support plate 21 and the CCD 23 arranged on the second support plate 21 when moving up or down along the guide rod 11.

Referring to FIG. 1 to FIG. 3, according to some embodiments of the present application, one end of the second support plate 21 is provided with a first elastic groove 212 communicated with the first guide hole 211; and the imaging assembly 20 further includes a first elasticity adjusting member 24, and the first elasticity adjusting member 24 penetrates through two side walls of the first elastic groove 212 to adjust the elasticity of the first elastic groove 212.

Exemplarily, the first elasticity adjusting member 24 includes a stud and a nut. The size of the opening of the first elastic groove 212 can be adjusted. Specifically, the distance between two side walls of the first elastic groove 212 can be adjusted by tightening or loosening the first elasticity adjusting member 24, so as to achieve fixed connection or release fixation between the second support plate 21 and the guide rod 11.

By arranging the first elastic groove 212 and adjusting the size of the opening of the first elastic groove 212 through the first elasticity adjusting member 24, in this way, when the imaging assembly 20 is adjusted to an appropriate position, the opening of the first elastic groove 212 can be reduced by tightening the first elasticity adjusting member 24, and then, the second support plate 21 can be fixed at the corresponding position of the guide rod 11, thereby ensuring the stability of the imaging assembly 20 when shooting the carved code image of the battery top cover 200; and the first elastic groove 212 can be enlarged by loosening the first elasticity adjusting member 24, and then, the fixation between the second support plate 21 of the imaging assembly 20 and the guide rod 11 can be released. The operation is simple and fast.

Referring to FIG. 1 and FIG. 3, according to some embodiments of the present application, the connecting plate assembly 22 includes a first plate body 221 and a second plate body 222 adjustably and fixedly connected to the first plate body 221, one end of the first plate body 221 is fixedly connected to one side of the second support plate 21, the other end of the first plate body 221 extends away from the second support plate 21 along the horizontal direction, the second plate body 222 is fixedly connected to the CCD 23, and the second plate body 222 is adapted to move relative to the first plate body 221 in a direction close to or away from the second support plate 21.

The second plate body is adjustably and fixedly connected to the first plate body 221, that is, the second plate body 222 can move relative to the first plate body 221 and can be fixed with the first plate body 221 after moving to an appropriate position.

When the second plate body 222 moves relative to the first plate body 221 in a direction close to or away from the second support plate 21, that is, after the CCD 23 is adjusted to an appropriate position along the horizontal direction in a direction close to or away from the second support plate 21, the second plate body 222 is fixed with the first plate body 221, so that when shooting carved code images of the battery top cover 200 of different sizes and specifications, the CCD can shoot clear and complete carved code images, resulting in wider product applicability.

Referring to FIG. 3, according to some embodiments of the present application, the first plate body 221 and the second plate body 222 are lapped, the first plate body 221 is provided with a first sliding groove, the second plate body 222 is provided with a second sliding groove 2221 communicated with the first sliding groove, and both the first sliding groove and the second sliding groove 2221 extend away from the second support plate 21 along the horizontal direction, and are configured for fasteners to pass through to fix the relative positions of the first plate body 221 and the second plate body 222.

Exemplarily, the first sliding groove and the second sliding groove 2221 are U-shaped grooves, of course, the first sliding groove and the second sliding groove 2221 may also be rectangular grooves, and the like. The fastener is a bolt.

When the second plate body 222 moves relative to the first plate body 221 to an appropriate position, fasteners are used to pass through the first sliding groove and the second sliding groove 2221 to fasten the first plate body 221 and the second plate body 222, so as to prevent the relative movement between the first plate body 221 and the second plate body 222 in a free state, thereby ensuring the stability of the CCD 23 when shooting images.

Referring to FIG. 1 and FIG. 2, according to some embodiments of the present application, the visual detection system further includes a light source assembly 40, and the light source assembly 40 is arranged below the imaging assembly 20 and is adjustably and fixedly connected to the guide rod 11.

The light source assembly is adjustably and fixedly connected to the guide rod 11, that is, the light source assembly 40 can move along the guide rod 11 and is fixed with the guide rod 11 after moving to an appropriate position.

By arranging the light source assembly 40 below the imaging assembly 20, the light source assembly 40 is configured to provide a light source in conjunction with the imaging assembly 20, so as to ensure clearer carved code images shot by the imaging assembly 20.

Referring to FIG. 1 and FIG. 2, according to some embodiments of the present application, the light source assembly 40 includes a third support plate 41, a light source connecting plate 42 connected to one side of the third support plate 41, and a light-emitting element 43 connected to the light source connecting plate 42, and the third support plate 41 is adjustably and fixedly connected to the guide rod 11.

The third support plate is adjustably and fixedly connected to the guide rod 11, that is, the third support plate 41 can move along the length direction of the guide rod 11 and can be fixed with the guide rod 11 when moving to an appropriate position.

By arranging the third support plate 41 adjustably and fixedly connected to the guide rod 11, the light-emitting element 43 can cooperate with the imaging assembly 20 to emit a light source at an appropriate height, thereby ensuring clearer images shot by the imaging assembly 20.

Referring to FIG. 1 and FIG. 2, according to some embodiments of the present application, the third support plate 41 is provided with second guide holes, the guide rod 11 is inserted into the second guide hole, and one end of the third support plate 41 is provided with a second elastic groove 411 communicated with the second guide hole; and the light source assembly 40 further includes a second elasticity adjusting member, and the second elasticity adjusting member penetrates through two side walls of the second elastic groove 411 to adjust the elasticity of the second elastic groove 411.

The second guide hole is a through hole penetrating through the thickness direction of the third support plate 41, the second guide hole and the first guide hole 211 are coaxially arranged, and the first guide hole 211 and the second guide hole are adapted to the guide rod 11 in size.

Exemplarily, the second elasticity adjusting member also includes a stud and a nut. The size of the opening of the second elastic groove 411 can also be adjusted adaptively. Specifically, the distance between two side walls of the second elastic groove 411 can be adjusted by tightening or loosening the first elasticity adjusting member 24, so as to achieve fixed connection or release fixation between the third support plate 41 and the guide rod 11.

By arranging the second elastic groove 411 and adjusting the size of the opening of the second elastic groove 411 by the second elasticity adjusting member, in this way, when the light-emitting element 43 is adjusted to an appropriate position, the opening of the second elastic groove 411 can be reduced by tightening the second elasticity adjusting member, and then, the third support plate 41 can be fixed at the corresponding position of the guide rod 11, thereby ensuring the stability of mounting and fixing of the light-emitting element 43; and the second elastic groove 411 can be enlarged by loosening the second elasticity adjusting member, then, the fixation between the third support plate 41 and the guide rod 11 can be released, and at this time, the third support plate 41 can move along the guide rod 11. The operation is simple and fast.

According to some embodiments of the present application, the light-emitting element 43 is configured to optionally emit light of different colors.

Exemplarily, the light-emitting element 43 is a light-emitting diode and is annular, and the CCD 23 is arranged above the light-emitting element 43 and located on the axis of the light-emitting element 43.

Since different types of battery top covers 200 may have different colors, the light-emitting element 43 is configured to emit light of different colors. As a result, when the imaging assembly 20 shoots the carved code image of the battery top cover 200, the light-emitting element 43 is used to emit light matched with the color of the battery top cover 200, so as to avoid interference between the color of the battery top cover 200 and a single light source, so that the image shot by the imaging assembly 20 is clearer, which helps to improve the accuracy of identification and detection of the carved code of the battery top cover 200.

Referring to FIG. 1 and FIG. 2, according to some embodiments of the present application, the carved code quality detection apparatus further includes a position display 50, and the position display 50 is arranged between the driving member and the baffle 13 and is in threaded connection with the lead screw 32 to display the height of the CCD 23.

Exemplarily, the position display 50 is a position display 50 with a reading function, of course, the position display 50 may also be a position display 50 with a voice playing function.

The height of the CCD 23 can be detected and displayed in real time by the position display 50. By recording the height information of the CCD 23 when detecting different types of battery top covers 200, when the type of the battery top cover 200 to be detected is changed, the height information of the CCD 23 matched with this type of battery top cover 200 can be quickly found, and the CCD 23 can be quickly adjusted to this height.

Referring to FIG. 1, according to some embodiments of the present application, two guide rods 11 are provided, and the two guide rods 11 are symmetrically arranged relative to a center line of the baffle 13.

Specifically, two guide rods 11 are symmetrically arranged on two sides of the lead screw 32, two first guide holes 211 on the second support plate 21 and two second guide holes on the third support plate 41 are provided, and the two guide rods 11 are sequentially inserted into the two first guide holes 211 and the two second guide holes correspondingly.

By symmetrically arranging the two guide rods 11 relative to the center of the baffle 13, the stability and reliability of the support function of the support assembly 10 can be improved, and the stability of the imaging assembly 20 when reciprocating along the length direction of the guide rod 11 can be further improved.

According to some embodiments of the present application, referring to FIG. 1 to FIG. 3, the present application provides a carved code quality detection apparatus 100 for a battery top cover 200, including a support assembly 10, an imaging assembly 20, a light source assembly 40 and a driving assembly 30, wherein the support assembly 10 includes two parallel and spaced guide rods 11 and a baffle 13 and a first support plate 12 which are respectively arranged at the upper ends and lower ends of the guide rods 11, and the two guide rods 11 are symmetrically arranged relative to a center line of the baffle 13 and extend along the height direction; the imaging assembly 20 includes a second support plate 21 movably connected to the guide rod 11, and a CCD camera 231 and a lens 232 which are connected to the second support plate 21; the light source assembly 40 is arranged below the imaging assembly 20 and is adjustably and fixedly connected to the guide rod 11 to provide a light source; and the driving assembly 30 includes a rotating hand wheel 31 arranged on the baffle 13, a lead screw 32 connected to the rotating hand wheel 31 and extending along the height direction, and a screw cap in threaded connection with the lead screw 32, wherein the screw cap is connected to the second support rod to drive the imaging assembly 20 to move up or down along the lead screw 32 when the driving member drives the lead screw 32 to rotate.

Specifically, before detection, first, the driving assembly 30 is used to drive the imaging assembly 20 to move up or down along the guide rod 11 to adjust the distance between the imaging assembly 20 and the battery top cover 200 to an appropriate distance, and then correspondingly adjust the distance between the light source assembly 40 and the battery top cover 200, and the light source assembly 40 cooperates with the imaging assembly 20 to provide an appropriate light source, so that the imaging assembly 20 can shoot clearer carved code images to ensure the accuracy of carved code quality detection. During detection, the CCD camera 231 and the lens 232 of the imaging assembly 20 send the shot carved code image on the battery top cover 200 to the image detection software of the visual detection system, and the image detection software compares and analyzes the carved code image shot by the imaging assembly 20 with the preset carved code image, so as to detect whether the carved code quality of the battery top cover 200 is qualified. The overall structure of the product is simple and easy to operate, the accuracy of carved code quality detection of the battery top cover 200 can be improved, the condition of incomplete detection, false detection or missed detection caused by manual visual inspection can be avoided, and the labor cost caused by manual visual inspection is reduced.

According to some embodiments of the present application, the present application further provides a carved code quality detection system for a battery top cover 200, including: an industrial personal computer; a conveyor, configured to convey the battery top cover 200; a code carving apparatus, configured to carve a code on the battery top cover 200; a carved code quality detection apparatus 100 according to any item in the above embodiments, arranged at the downstream side of the code carving apparatus, the visual detection system of the carved code quality detection apparatus 100 being electrically connected to the industrial personal computer; and a removing apparatus, arranged at the downstream side of the carved code quality detection apparatus 100 and electrically connected to the industrial personal computer to remove the battery top cover 200 from the conveyor.

According to the carved code quality detection apparatus 100 for a battery top cover 200 provided by the present application, the battery top cover 200 is conveyed by the conveyor; after the code carving mechanism carves a code on the battery top cover 200, the conveyor conveys the battery top cover 200 after code carving to the position below the imaging assembly 20 of the carved code quality detection apparatus 100; when the visual detection system detects that the carved code image of the battery top cover 200 is inconsistent with the preset standard carved code image, the industrial personal computer controls the removing apparatus to remove the battery top cover 200 from the position below the imaging assembly 20; and then, the next detection process is carried out to achieve the automated operation of the production line.

The above descriptions are only preferred specific embodiments of the present application, but the protection scope of the present application is not limited thereto. Any variation or replacement readily figured out by a person skilled in the art within the technical scope disclosed in the present application shall fall within the protection scope of the present application Therefore, the protection scope of the present application shall be determined with reference to the protection scope of the claims.

Finally, it should be noted that the above embodiments are merely used for illustrating rather than limiting the technical solutions of the present application. Although the present application has been described in detail with reference to the above embodiments, those of ordinary skill in the art should understand that the technical solutions specified in the above embodiments can still be modified, or some or all of the technical features therein can be equivalently substituted. Such modifications or substitutions do not make the essence of the corresponding technical solutions depart from the scope of the technical solutions of the embodiments of the present application, and shall fall within the scope of the claims and the specification of the present application. In particular, the technical features mentioned in the embodiments can be combined in any manner as long as there is no structural conflict. The present application is not limited to the specific embodiments disclosed herein, but rather includes all technical solutions falling within the scope of the claims.

The invention claimed is:

1. A carved code quality detection apparatus, comprising:
    a support assembly, comprising a guide rod, a baffle and a first support plate, the guide rod extending along the height direction, the baffle being fixedly connected to the upper end of the guide rod, and the first support plate being fixedly connected to the lower end of the guide rod;
    a visual detection system, comprising an imaging assembly movably connected to the guide rod;
    a driving assembly, arranged on the baffle and connected to the imaging assembly, the driving assembly being configured to drive the imaging assembly to move up or down,
    wherein the imaging assembly comprises a second support plate, a connecting plate assembly connected to one side of the second support plate, and a charge coupled device (CCD) connected to the connecting plate assembly,
    wherein the second support plate is fixedly connected to a screw drive member, the second support plate is provided with first guide holes, and the guide rod is inserted into the first guide hole.

2. The apparatus according to claim 1, wherein the driving assembly comprises:
    a lead screw, extending along the height direction, the first end of the lead screw penetrating through the baffle;
    the screw drive member in threaded connection with the lead screw, the screw drive member being fixedly connected to the imaging assembly, and the screw drive member being configured to drive the imaging assembly to reciprocate along the length direction of the lead screw when the lead screw rotates; and
    a driving member, arranged on the baffle and connected to the first end of the lead screw to drive the lead screw to rotate.

3. The apparatus according to claim 1, wherein one end of the second support plate is provided with a first elastic groove communicated with the first guide hole; and
    the imaging assembly further comprises a first elasticity adjusting member, and the first elasticity adjusting member penetrates through two side walls of the first elastic groove to adjust the elasticity of the first elastic groove.

4. The apparatus according to claim 1, wherein the connecting plate assembly comprises a first plate body and a second plate body adjustably and fixedly connected to the first plate body, one end of the first plate body is fixedly connected to one side of the second support plate, the other end of the first plate body extends away from the second support plate along the horizontal direction, the second plate body is fixedly connected to the CCD, and the second plate body is adapted to move relative to the first plate body in a direction close to or away from the second support plate.

5. The apparatus according to claim 4, wherein the first plate body and the second plate body are lapped, the first plate body and the second plate body are respectively provided with a first sliding groove and a second sliding groove, and both the first sliding groove and the second sliding groove extend away from the second support plate along the horizontal direction, and are configured for fasteners to pass through to fix the relative positions of the first plate body and the second plate body.

6. The apparatus according to claim 1, wherein the visual detection system further comprises a light source assembly, and the light source assembly is arranged below the imaging assembly and is adjustably and fixedly connected to the guide rod.

7. The apparatus according to claim 6, wherein the light source assembly comprises a third support plate, a light source connecting plate connected to one side of the third support plate, and a light-emitting element connected to the light source connecting plate, and the third support plate is adjustably and fixedly connected to the guide rod.

8. The apparatus according to claim 7, wherein the third support plate is provided with second guide holes, the guide rod is inserted into the second guide hole, and one end of the third support plate is provided with a second elastic groove communicated with the second guide hole; and the light source assembly further comprises a second elasticity adjusting member, and the second elasticity adjusting member penetrates through two side walls of the second elastic groove to adjust the elasticity of the second elastic groove.

9. The apparatus according to claim 7, wherein the light-emitting element is configured to optionally emit light of different colors.

10. The apparatus according to claim 1, further comprising: a position display, arranged between the driving member and the baffle and in threaded connection with the lead screw to display the height of the CCD.

11. The apparatus according to claim 1, wherein two guide rods are provided, and the two guide rods are symmetrically arranged relative to a center line of the baffle.

12. A carved code quality detection system, comprising:
an industrial personal computer;
a conveyor, configured to convey a member to be detected;
a code carving apparatus, configured to carve a code on the member to be detected;
a carved code quality detection apparatus according to claim 1, arranged at the downstream side of the code carving apparatus, the visual detection system of the carved code quality detection apparatus being electrically connected to the industrial personal computer; and
a removing apparatus, arranged at the downstream side of the carved code quality detection apparatus and electrically connected to the industrial personal computer to remove the member to be detected from the conveyor.

* * * * *